United States Patent
Parikh et al.

[15] 3,705,181
[45] Dec. 5, 1972

[54] METHOD FOR THE PREPARATION OF 6-METHYL-3-OXO-DELTA 4,6 STEROIDS

[72] Inventors: Jekishan R. Parikh, Kalamazoo, Mich. 49008; Max E. Breuer, Kalamazoo, Mich. 49002

[73] Assignee: The Upjohn Company, Kalamazoo, Mich.

[22] Filed: Oct. 19, 1971

[21] Appl. No.: 190,654

[52] U.S. Cl............................260/397.4, 260/397.45
[51] Int. Cl...............................................C07c 169/34
[58] Field of Search......./Machine Searched Steroids

[56] References Cited

OTHER PUBLICATIONS

Burn et al.–Tetrahedron 21, pp. 1619– 1624 (1965).

*Primary Examiner*—Henry A. French
*Attorney*—John Kekich et al.

[57] ABSTRACT

The isomerization of 6-methylene-pregn-4-ene-3-keto compounds to the corresponding 6-methyl-3-oxy-$\Delta^{4,6}$-pregnadiene compounds is carried out by their treatment with a strong acid, preferably an aryl or alkyl sulfonic acid, sulfuric or perchloric acid; preferably, also in the presence of an acylating agent such as a carboxylic acid anhydride or chloride.

2 Claims, No Drawings

METHOD FOR THE PREPARATION OF 6-METHYL-3-OXO-DELTA 4,6 STEROIDS

BACKGROUND OF THE INVENTION

The isomerization of certain 6-methylene-4-ene-3-one steroid compounds to the biologically important 6-methyl-4,6-diene-3-one steroid compounds has been carried out in the presence of palladium on charcoal and sodium acetate employing cyclohexene as hydrogen transfer reagent. The art attempted unsuccessfully to isomerize the 6-methylen-4-en-3-one system to 6-methyl-4,6-dien-3-one by a variety of acid and base treatments, Tetrahedron 21, 1619 (1965).

We have discovered that compounds of the following formula:

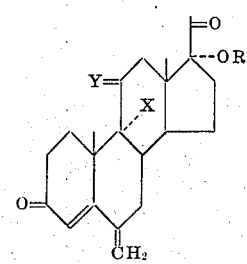

wherein R is H or Ac as defined below, X is hydrogen or halogen, and Y is (H,H), =O, (H, $\alpha$OH) or (H,$\beta$OH) can be isomerized (where R=Ac) or converted by a single stage simultaneous 17-acylation and isomerization (where R = H) to the compound:

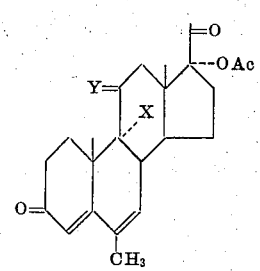

where Ac is an acyl radical of a carboxylic acid containing from two to 12 carbon atoms, by isomerizing I by treating with a strong acid in the presence of an acylating agent corresponding to Ac such as a carboxylic acid anhydride or halide; or an equivalent acylating agent such as isopropenyl ester. The reaction is preferably carried out in an inert medium in the presence of an aryl sulfonic acid such as p-toluenesulphonic acid.

Temperature range of reaction (representative temperature range in degrees): room temperature (i.e., about 15° C.) to the boiling point of the reaction medium such as benzene, toluene, xylene.

The strong acid can be present in a quantity as low as a catalytic amount i.e., about 0.001 molar equivalent up to 5 to 10 molar equivalent, based on the steroid. Within this range, the quantity of catalyst is determined principally by convenience.

Typical strong acids include p-toluenesulfonic acid, benzene sulfonic acid, methanesulfonic acid, p-nitrobenzene sulfonic acids, perchloric, sulfuric acid, hydrochloric acid and trichloroacetic acid. Acids which are substantially dissociated in non-aqueous systems can be used.

Typical acylating agents include acetic anhydride, propionic anhydride, benzoic anhydride, acetyl chloride, benzoyl chloride, isopropenyl acetate and isopropenyl propionate.

The temperature of the reaction is between the range of room temperature up to and including the boiling point of the reaction mixture in which the isomerization occurs. This can be up to about 120° C., but the use of solvent systems boiling at around 80° C. is preferred.

DETAILED DESCRIPTION OF THE INVENTION

EXAMPLE 1

17-Acetoxy-6-methylpregna-4,6-diene-3,20-dione (Megestrol Acetate), ($II_m$)

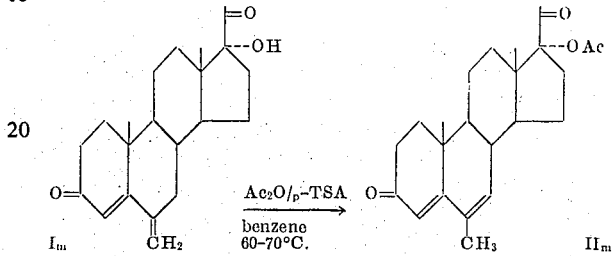

Reaction of 17$\alpha$-hydroxy-6-methylene-pregn-4-ene-3,20-dione ($I_m$) (0.071 moles) with acetic anhydride (0.66 mole) in the presence of p-toluenesulfonic acid (0.03 mole) and in benzene (5 mls./gm. steroid) as reaction medium, for 95 min. at 60°–70° C., led to a reaction product which consisted of a mixture of several components. Vapor phase chromatographic (VPC) analysis of this mixture showed the presence of $II_m$ as major product. Column chromatography of the mixture and analyses below led to the characterization of the major fraction as $II_m$:

| Analysis | Observed |
|---|---|
| M.P. | 213–217° C. |
| $[\alpha]_D$ | +8° (CHCl$_3$) |
| EtOH | 288m$\mu$ ($\epsilon$ 24,250) |

IR: Same as that of an authentic sample of $II_m$.
NMR(CDCl$_3$):
44($C_{18}$-Me), 67($C_{19}$-Me), 112 ($C_6$-Me), 223 ($C_{21}$-Me),
226($C_{17}$-OAc), 352($C_4$-H) 360 ($C_6$-H) cps
Mass spec. M$^+$ 384

EXAMPLE 2

To 8.5 gms. of $I_m$ was added 1 liter of benzene followed by 41 mls. of Ac$_2$O and a solution of 21.5 gms. of p-TSA in 215 mls. benzene. Additional 485 mls. benzene was added so that the total volume of benzene was 1700 mls. (or 0.5% w/v conc. of steroid). The mixture was stirred under reflux and the reaction was followed on thin layer chromatography (TLC) and by VPC. At the end of a 5 hr. reaction period the mixture was cooled to 25° C., and while keeping it cold 250 mls. water was added at a controlled rate so as to maintain the temperature between 25°–30° C. After the end of the addition, the mixture was stirred at room temperature for 10–15 minutes. The benzene phase was separated. The aqueous phase was washed once with 50 mls. benzene. The combined benzene phase was washed with 1 × 100 mls. water, 2 × 50 mls. 5% NAHCO$_3$ solution and finally with 4 × 100 mls. water to neutral pH. The benzene was distilled off under vacuum and the solid residue was dried under vacuum at 60° C. Yield: 9.93 gms. The TLC of this crude product showed a major spot corresponding to the product II$_m$.

U. V. assay of the crude product showed 88.7% II$_m$ content ($\lambda_{max}^{EtOH}$ 288 $\epsilon$ 21,250).

Recrystallization of the above crude from EtOAc gave II$_m$ in two crops.

| Analysis | First Crop | Second Crop |
|---|---|---|
| M.P. | 213–216.5° C. | 210.5–214° |
| $[\alpha]_D$ | +13° | +14° |
| EtOH 288mµ max | ($\epsilon$ 24,219) | ($\epsilon$ 23,782) |

NMR - consistent with II$_m$.

There can be substituted in the foregoing examples 17α-hydroxy-9α-fluoro-6-methylene-pregn-4-ene-3,20-dione, leading directly to 17α-hydroxy-9α-fluoro-6-methyl-pregn-4,6-diene-3,20-dione 17 acetate. Further, substitution of 17α-hydroxy-9α-fluoro-11β-hydroxy-6-methylene-pregn-4-ene-3,20-dione for the starting material of the above examples can lead directly to 17α-hydroxy-9α-fluoro-11β-hydroxy-6-methyl-pregna-4,6-diene-3,20-dione 17 acetate.

EXAMPLE 3

Isomerization of 6-methylene-17α-acetoxyprogesterone

This example gives comparison data illustrating the unobvious beneficial effect on the results of the presence of the acylating agent in the isomerization reaction mixture.

To 0.5 gm. (0.0013 mole = 1.3 millimole) of 6-methylene-17α-acetoxyprogesterone was added 75 mls. of benzene followed by a solution of 1.12 gm. (0.0065 mole or 6.5 millimole) p-toluenesulfonic acid in benzene. The reaction mixture was stirred at reflux temperature for four hours and the course of the reaction was followed by periodical checks on thin layer chromatography (TLC). No starting material was found to be present at the end of a four hour reaction period. The reaction mixture was cooled to 20° C., and the benzene solution was washed with 3% sodiumcarbonate solution followed by water to neutral pH. It was then taken to dryness under vacuum. The amorphous solid product (0.49 gm.) assayed 46% by weight of II$_m$. The rest of the product consisted of the dimer. No starting material was present.

When the above reaction was repeated employing additionally in the reaction mixture 2 mls. of acetic anhydride (0.02 mole = 20 millimole), the product obtained in quantitative yield assayed 89% II$_m$.

We claim:

1. A method for producing a compound of the formula:

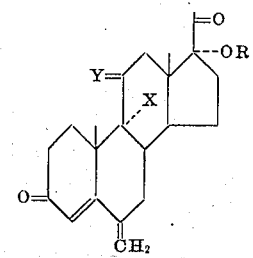

I where Ac is an acyl radical of a hydrocarbon carboxylic acid containing from two to 12 carbon atoms, X is a member of the group consisting of hydrogen and halogen, and Y is a member selected from the group consisting of (H,H), (=O) and (H,βOH) which comprises heating a compound of the formula:

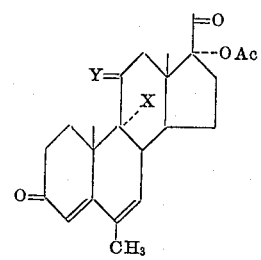

II wherein R is H or Ac as defined above, in the presence of a strong acid and a carboxylic acid acylating agent corresponding to Ac.

2. The method of claim 1 wherein X is H, Y is (H,H,) and Acyl is acetyl.

* * * * *